(12) United States Patent
Liu et al.

(10) Patent No.: US 11,830,225 B2
(45) Date of Patent: Nov. 28, 2023

(54) GRAPHICS RENDERING WITH ENCODER FEEDBACK

(71) Applicant: ATI TECHNOLOGIES ULC, Markham (CA)

(72) Inventors: Yang Liu, Markham (CA); Ihab Amer, Markham (CA); Gabor Sines, Markham (CA); Boris Ivanovic, Markham (CA); Jinbo Qiu, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 15/993,074

(22) Filed: May 30, 2018

(65) Prior Publication Data

US 2019/0371006 A1 Dec. 5, 2019

(51) Int. Cl.
*G06T 9/00* (2006.01)
*G06T 15/00* (2011.01)

(52) U.S. Cl.
CPC .............. *G06T 9/00* (2013.01); *G06T 15/005* (2013.01); *G06T 2210/08* (2013.01); *G06T 2210/36* (2013.01)

(58) Field of Classification Search
CPC ..... G06T 9/00; G06T 15/005; G06T 2210/08; G06T 2210/36; H04N 19/117; H04N 19/51; H04N 19/164; H04N 19/00
USPC ......................................................... 345/428
See application file for complete search history.

(56) References Cited

U.S. PATENT DOCUMENTS

| | | | |
|---|---|---|---|
| 9,704,270 B1* | 7/2017 | Main ........................ | G06T 15/60 |
| 10,062,181 B1* | 8/2018 | Longhurst ................. | G06T 7/11 |
| 2006/0204115 A1 | 9/2006 | Burazerovic | |
| 2008/0152235 A1* | 6/2008 | Bashyam ............... | H04N 19/91 |
| | | | 382/224 |
| 2009/0237564 A1* | 9/2009 | Kikinis ................ | H04N 13/398 |
| | | | 348/584 |

(Continued)

FOREIGN PATENT DOCUMENTS

| | | |
|---|---|---|
| CN | 101411198 | 4/2009 |
| CN | 102783169 A | 11/2012 |

(Continued)

OTHER PUBLICATIONS

Semsarzadeh, Mehdi, et al., "Video Encoding Acceleration in Cloud Gaming", IEEE Transactions on Circuits and Systems for Video Technology, vol. 25, Issue 12, Dec. 2015, 14 pages.

(Continued)

*Primary Examiner* — Weiming He

(57) ABSTRACT

A feedback processing module includes a memory configured to store feedback received from an encoder. The feedback includes parameters associated with encoded graphics content generated by a graphics engine. The feedback processing module also includes a processor configured to generate configuration information for the graphics engine based on the feedback. The graphics engine is configured to execute a workload based on the configuration information. In some cases, the feedback processing module is also configured to receive feedback from a decoder that is used to decode the graphics content that is encoded by the encoder and generate the configuration information based on the feedback received from the decoder.

20 Claims, 4 Drawing Sheets

(56) References Cited

U.S. PATENT DOCUMENTS

| | | | |
|---|---|---|---|
| 2009/0278842 A1 | 11/2009 | Peterfreund | |
| 2011/0090960 A1* | 4/2011 | Leontaris | H04N 19/154 375/240.12 |
| 2012/0120054 A1* | 5/2012 | Sandrew | H04N 13/257 345/419 |
| 2013/0208809 A1 | 8/2013 | Lu et al. | |
| 2014/0307785 A1* | 10/2014 | Topiwala | H04N 19/115 375/240.07 |
| 2014/0321561 A1 | 10/2014 | Stec et al. | |
| 2014/0347376 A1 | 11/2014 | Tateno et al. | |
| 2015/0003515 A1 | 1/2015 | Normile et al. | |
| 2015/0022675 A1* | 1/2015 | Lord | G06K 9/6253 348/207.1 |
| 2016/0056927 A1 | 2/2016 | Liu et al. | |
| 2016/0088285 A1* | 3/2016 | Sadi | H04N 13/254 348/43 |
| 2016/0112708 A1* | 4/2016 | Grundy | H04N 19/136 375/240.08 |
| 2016/0148650 A1* | 5/2016 | Laksono | G06K 9/00718 386/230 |
| 2016/0359939 A1 | 12/2016 | Truax | |
| 2017/0094295 A1 | 3/2017 | Gu | |
| 2018/0084257 A1* | 3/2018 | Abbas | H04N 19/176 |
| 2018/0085002 A1* | 3/2018 | Glinec | G06T 7/73 |
| 2018/0310008 A1* | 10/2018 | Kopietz | G06T 15/005 |

FOREIGN PATENT DOCUMENTS

| | | |
|---|---|---|
| CN | 104243440 A | 12/2014 |
| CN | 105357524 A | 2/2016 |
| CN | 105828072 A | 8/2016 |
| CN | 106951204 | 7/2017 |
| WO | 2009138878 A2 | 11/2009 |
| WO | 2013148002 A2 | 10/2013 |

OTHER PUBLICATIONS

Cheung, Gene, et al., "Fast H.264 Mode Selection Using Depth Information for Distributed Game Viewing", Proc. of Visual Communications and Image Processing, San Jose, CA, Jan. 2008, 12 pages.

Cai, Wei, et al., "A Survey on Cloud Gaming: Future of Computer Games", IEEE Access, vol. 4, Aug. 8, 2016, 25 pages.

International Search Report and Written Opinion dated Oct. 24, 2019 for International Application No. PCT/IB2019/052608, 13 pages.

Extended European Search Report dated Mar. 16, 2022 for European Application No. 19811114.8, 9 pages.

Translation of Office Action dated Jan. 11, 2022 for Chinese Application No. 201980043358.3, 22 pages.

Chinese Office Action issued in Application No. 201980043358.3, dated Jul. 21, 2022, 19 pages.

Translation of Indian Office Action issued in Application No. 202017054754, dated Sep. 8, 2022, 6 pages.

Office Action issued in Japanese Application No. 201980043358, dated Mar. 31, 2023, 7 pages.

Office Action issued in Chinese Application No. 201980043358, dated Mar. 31, 2023, 7 pages.

Office Action issued in Japanese Application No. 2020-566981, dated Apr. 18, 2023, 4 pages.

Office Action issued in Japanese Application No. 2020-566981, dated Aug. 8, 2023, 4 pages.

Office Action issued in Chinese Application No. 201980043358, dated Jul. 21, 2023, 10 pages.

\* cited by examiner

GRAPHICS RENDERING WITH ENCODER FEEDBACK

BACKGROUND

Cloud services, such as cloud gaming and virtual desktop applications, are used to perform computationally intensive tasks such as executing game logic and rendering high-resolution three-dimensional (3D) graphics. Shifting the computationally intensive tasks to cloud servers allows such applications to provide services to smart phones, tablets, and other thin devices that lack the computational power to execute the full application. For example, a cloud gaming application implemented on a cloud server receives control input from the client. The cloud gaming application uses the control input to generate or modify a 3D scene that represents the game world. A graphics engine renders the scene and the rendered scene is encoded for transmission from the cloud server to the client device, which receives and decodes the encoded video frames for presentation on a screen of the client device. Thus, the client does not consume graphics content received directly from the graphic engine. Instead, the client consumes graphics content that has been encoded (e.g., as a compressed bitstream) at the cloud server and then decoded (e.g., by decompressing the compressed bitstream) at the client. The encoder implemented at the cloud server therefore determines, at least in part, the quality of the images displayed on the screen of the client device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
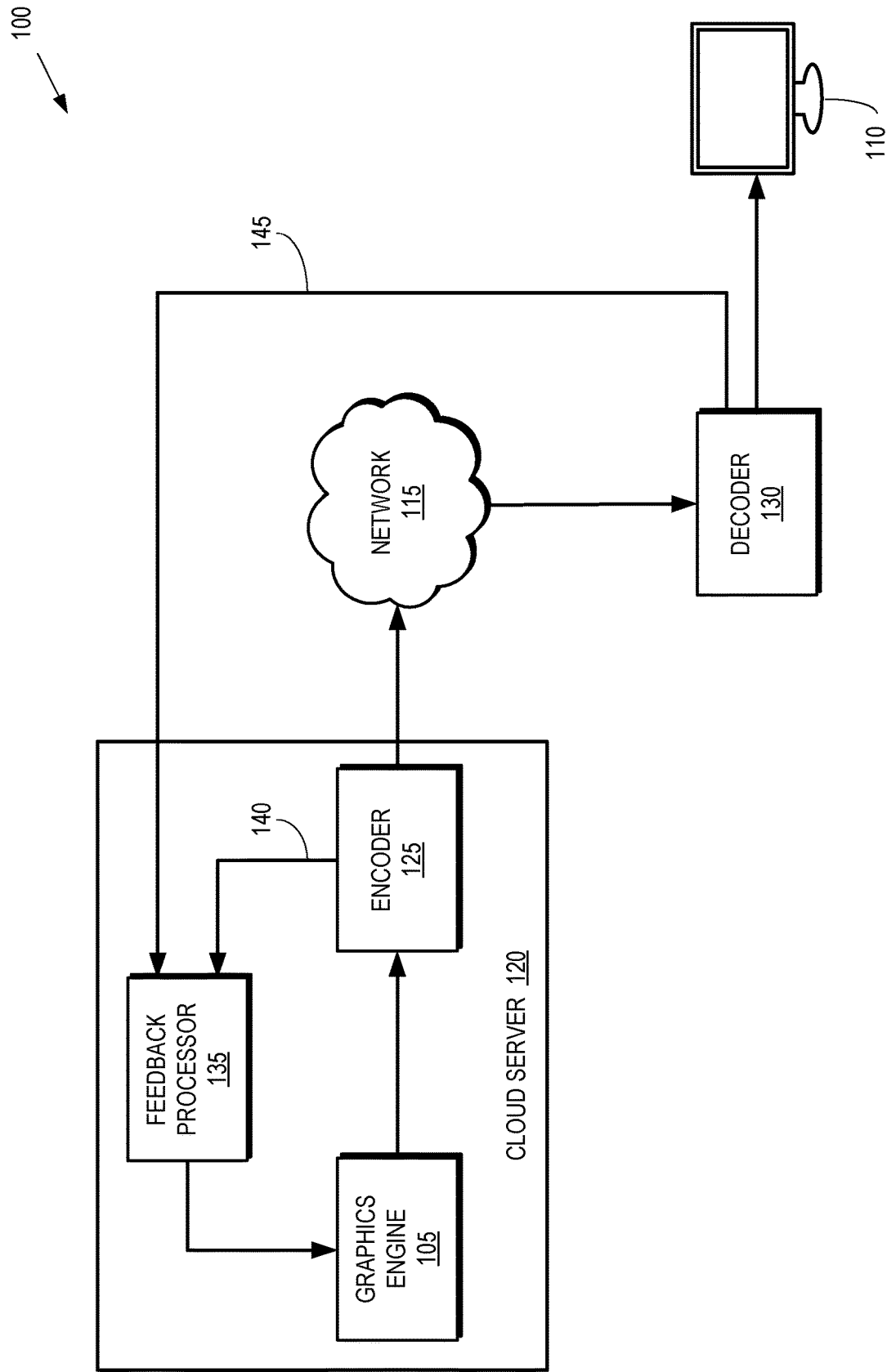
FIG. 1 is a block diagram of a graphics processing system according to some embodiments.

Cloud servers incorporate video encoders to compress data for transmission over a network that connects the cloud server to client devices. Video compression is typically performed on the basis of two-dimensional (2D) video codecs or multiview video codecs (MVCs) such as but not limited to H.264/MVC, H.265 (HEVC), VP8, VP9, and AV1. In some cases, the graphics engine provides additional information to assist the video encoder. For example, the graphics engine provides depth information to the video encoder, which uses this information to locate a region of interest (ROI) in the image. The encoder then allocates additional bits for encoding the portion of the image in the ROI. For another example, the graphics engine provides graphics contexts to assist compression of the video images. In some cases, encoding parameters such as the encoding frame rate or quantization are modified in response to changing network conditions including changes in bandwidth, round trip times, jitter, and the like. However, the graphics engine remains unaware of the adaptations performed at the encoder because the conventional cloud server does not include channels for communication of information from the encoder back to the graphics engine. The lack of feedback results in lower visual quality of the encoded bitstream and unnecessary computation at the graphics engine. For example, the graphics engine enables a full suite of 3D effects to render highly textured content but, in some cases, encoder constraints prevent the encoder from delivering the graphics content at the quality level produced by the graphics engine, which degrades the user experience.

FIGS. 1-4 disclose apparatuses, systems, and methods of providing feedback from an encoder to a feedback processing module to increase efficiency of graphics processing in a cloud server, while conserving bandwidth and maintaining the quality of user experience at a client device. The feedback processing module generates information used to configure a graphics engine that provides graphics content to the encoder. In some embodiments, the feedback provided by the encoder includes information such as a bit rate cost for different regions in the graphics content, an available bandwidth, a variance in the graphics content, motion activity in the graphics content, detection of a change of scene in the graphics content, quantization strength, spatial variance, prediction mode, objective quality metrics, and the like. The feedback can also include information associated with pre-processing of the graphics content prior to encoding or post-processing at receiver after decoding the encoded graphics content graphics content. For example, the pre-processing or post-processing information includes Fast Fourier Transform (FFT) parameters, discrete cosine transform (DCT) parameters, histograms, edge detection results, text detection results, and the like. Some embodiments of the feedback processing module also receive feedback from a decoder that is used to decode the encoded graphics content. The feedback processing module is implemented using a field programmable gate array (FPGA), a central processing unit (CPU), a graphics processing unit (GPU), a fixed function hardware block, or other processing unit. The feedback processing module generates the configuration information using instructions provided by the application, an empirically generated lookup table, a close-loop control method, machine learning, a neural network, regressive modeling, and the like.

The feedback processing module provides the configuration information to the graphics engine, which modifies rendering settings or other options based on the configuration information. For example, the feedback processing module uses bit rate costs for different regions of the picture to generate configuration information indicating that the graphics engine should turn off 3D effects in portions of the picture that have relatively high bit rate costs. For another example, the feedback processing module instructs the graphics engine to turn off some 3D rendering effects in response to receiving feedback information indicating that there is insufficient bandwidth to support the encoder quantization of high-quality 3D rendering effects. For yet another example, the feedback processing module instructs the graphics engine to modify a rendering frame rate in response to feedback information indicating that the encoder is able to vary its frame rate on a predetermined frame boundary to reduce the bandwidth of the encoded bitstream. For yet another example, the feedback processing module instructs the graphics engine to render the graphics content at a lower image resolution based on the encoder statistics received in feedback from the encoder.

FIG. 1 is a block diagram of a graphics processing system 100 according to some embodiments. The graphics processing system 100 includes a graphics engine 105. Some embodiments of the graphics engine 105 are implemented using a graphics processing unit (GPU) that includes multiple processing elements (not shown in the interest of clarity) for processing threads of instructions independently or concurrently. For example, the graphics engine 105 is implemented using a GPU that operates according to single-instruction-multiple-data (SIMD) protocols. The graphics engine 105 is configured to perform tasks such as executing application logic (e.g., the logic used to control gaming applications) and rendering high-resolution three-dimensional (3D) graphics. The graphics engine 105 generates graphics content that is used to present scenes, images, or frames on a display 110.

The graphics engine 105 executes workloads to generate graphics content, which is provided to the display 110 via a network 115. In the illustrated embodiment, the graphics engine 105 is implemented on a cloud server 120 that communicates with the display 110 via the network 115. The graphics content is therefore encoded for transmission over the network 115 using an encoder 125, which is implemented in some embodiments of the cloud server 120. At least in part to conserve bandwidth within the network 115, the encoder 125 compresses the graphics content received from the graphics engine 105. Some embodiments of the encoder 125 compress the graphics content using a two-dimensional (2D) video codec or a multiview video codec (MVCs) such as but not limited to H.264/MVC, H.265 (HEVC), VP8, VP9, AV1. A decoder 130 receives the encoded graphics content from the encoder 125 via the network 115 and decodes the encoded graphics content. The decoded graphics content is then provided to the display 110 for presentation to a user. Although the illustrated embodiment depicts a cloud server 120 that provides content to a display 110 via the network 115, some embodiments of the techniques disclosed herein are equally applicable to other graphics processing systems in which the graphics engine 105 is separated from the display 110 by a wired or wireless network that requires encoding and decoding of the graphics content.

As discussed herein, the absence of feedback from the encoder 125 to the graphics engine 105 results in lower visual quality of the encoded bitstream and unnecessary computation at the graphics engine 105. The cloud server 120 therefore includes a feedback processor 135 to receive feedback 140 from the encoder 125 and provide configuration information to the graphics engine 105. The feedback processor 135 therefore provides channels for communication of information from the encoder 125 back to the graphics engine 105 so that the graphics engine 105 is aware of adaptations performed at the encoder 125. Some embodiments of the feedback processor 135 receive feedback 140 that includes parameters associated with encoded graphics content generated by the graphics engine 105. The feedback processor 135 is configured to generate configuration information for the graphics engine 105 based on the feedback 140. Some embodiments of the feedback processor 135 are also configured to receive feedback 145 from the decoder 130 and generate the configuration information based on the feedback 145 received from the decoder 130. The graphics engine 105 is configured using the configuration information generated by the feedback processor 135 and, once so configured, the graphics engine 105 executes one or more workloads to generate graphics content.

Figure 2:
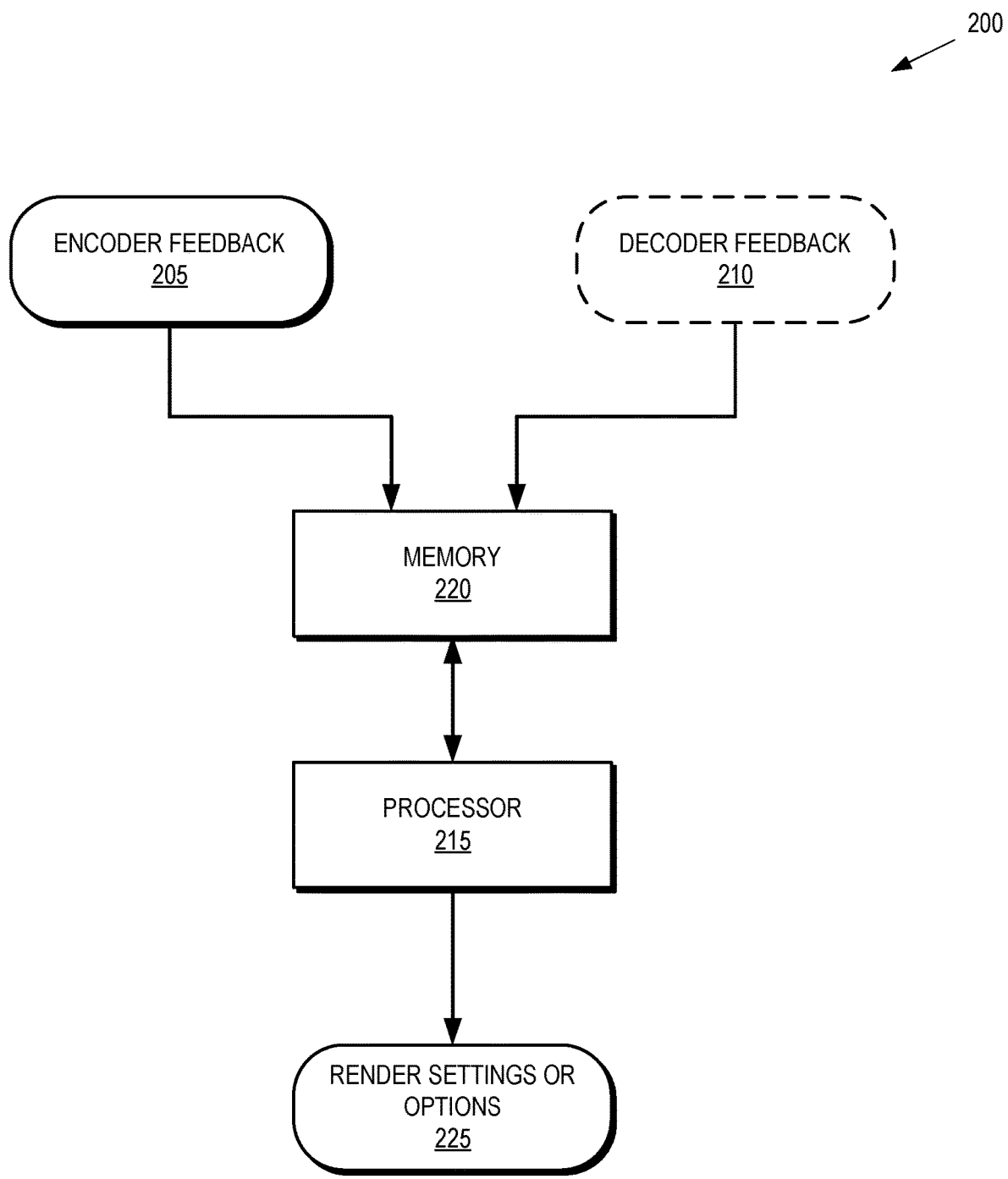
FIG. 2 is a block diagram of a feedback processing module according to some embodiments.

FIG. 2 is a block diagram of a feedback processing module 200 according to some embodiments. The feedback processing module 200 is used to implement some embodiments of the feedback processor 135 shown in FIG. 1. The feedback processing module 200 receives encoder feedback 205 such as the feedback 140 shown in FIG. 1. Some embodiments of the feedback 205 include statistical information received from an encoder that is used to encode raw graphics content received from a graphics engine. For example, the feedback 205 includes a bit rate cost for different regions-of-interest (ROIs) in the graphics content, an available bandwidth in a network such as the network 115 shown in FIG. 1, a variance in the graphics content, motion activity in the graphics content, detection of a change of scene in the graphics content, a quantization strength, a spatial variance, a prediction mode, objective quality metrics, and the like. Some embodiments of the feedback 205 also include information associated with preprocessing of the graphics content prior to encoding or post-processing at a receiver after decoding the encoded graphics content. For example, the pre-processing or post-processing information includes Fast Fourier Transform (FFT) parameters, discrete cosine transform (DCT) parameters, histograms, edge detection results, text detection results, and the like.

In the illustrated embodiment, the feedback processing module 200 receives decoder feedback 210 from a decoder such as the decoder 130 shown in FIG. 1. The decoder feedback 210 is optional and not provided to the feedback processing module 200 in some embodiments, as indicated by the dashed line. The decoder feedback 210 includes information characterizing the decoding process performed by the decoder. For example, the decoder feedback 210 includes information indicating a display size or resolution of the display that is to present the decoded graphics content, which impacts an assessment of how the graphics content is generated for the display. For another example, the decoder feedback 210 includes information indicating whether the decoder is successfully decoding the encoded graphics content in real time, which impacts a determination of the frame rate for the graphics content. The frame rate is increased if the decoder is successfully decoding the encoded graphics in real-time and decreased if the decoder is not able to keep up with decoding at the current frame rate. For yet another example, the decoder feedback 210 includes information identifying supported or unsupported codec tools, which is used to decide whether to perform different types of rendering. Rendering content to sub-pixel movement unnecessarily consumes resources if the decoder does not support sub-pixel motion compensation. In that case, the graphics engine is configured to only render content to full-pixel movement.

The feedback processing module 200 also includes a processor 215 and a memory 220. The processor 215 is used to execute instructions stored in the memory 220 and to store information in the memory 220 such as the results of the executed instructions. The memory 220 stores the encoder feedback 205 and, if available, the decoder feedback 210 so that the processor 215 is able to access the encoder feedback 205 and, if available, the decoder feedback 210. The processor 215 generates configuration information for a graphics engine (such as the graphics engine 105 shown in FIG. 1) based on the encoder feedback 205 and, if available, the decoder feedback 210.

Some embodiments of the processor 215 generate configuration information that is used to improve the quality of the image presented on the display. The encoder provides feedback that includes bit rate costs for different regions within the image. For example, the information includes a relatively high bit rate cost for regions at the top of the picture that are relatively static such as background portions of the image. The information therefore indicates that the encoder is allocating too many bits to encode these regions of the image, which results in other portions of the image being encoded using a smaller number of bits and therefore at lower quality. The processor 215 therefore generates configuration information that is used to configure the graphics engine to determine that the regions near the top of the image are in the background (e.g., using a bit depth map). The graphics engine turns off effects such as 3D effects in these regions, which allows the encoder to compress the graphics content that represents these regions more efficiently and at a higher quality. Moreover, the bits that are saved by reducing the complexity of the graphics content in the background regions are then available to improve the quality of other regions in the image such as foreground regions or highly variable regions.

Some embodiments of the processor 215 generate configuration information that is used to conserve power in the graphics engine or encoder. The encoder provides feedback indicating that the available network bandwidth is not sufficient to support the large degrees of quantization needed to encode high-quality 3D rendering effects in all regions of the image. The processor 215 then generates configuration information that is used to configure the graphics engine to turn off any unnecessary 3D effects, which allows the graphics engine to conserve power by utilizing fewer GPU cycles or consuming less memory and performing fewer memory access requests.

Some embodiments of the processor 215 generate configuration information that is used to vary a frame rate or images generated by the graphics engine. The encoder provides feedback indicating that the available network bandwidth is not sufficient to maintain a current image quality at the frame rate currently being used to render frames by the graphics engine. The encoder is able to vary its frame rate on predetermined boundaries in the graphics content. For example, the encoder uses frame rates of 30 frames per second (FPS), 50 FPS, 60 FPS, and the like. The processor 215 therefore generates configuration information that is used to configure the graphics engine to modify the frame rate used to render images. For example, the processor 215 generates configuration information that configures the graphics engine to reduce the rendering frame rate in response to the feedback indicating insufficient network bandwidth at the current frame rate.

Some embodiments of the processor 215 generate configuration information that is used to vary a size or a resolution of an image rendered by the graphics engine. The encoder provides feedback including statistics representative of the encoding process. In some cases, the statistics indicate whether motion depicted by the images is perceived as smooth by the user. The quality of the user experience is particularly important in graphics content produced by games that frequently represent continuous movement of elements within the image. The processor 215 therefore generates configuration information that is used to configure the graphics engine to modify the size of the resolution of the rendered images. For example, if the statistics indicate choppy or erratic motion, the configuration information is used to configure the graphics engine to reduce the image resolution (e.g., 1080p to 720p) to enhance the smoothness of the motion represented in the images.

The processor 215 outputs rendering settings or options 225, which are provided to the graphics engine and used to configure the graphics engine. The rendering settings or options 225 are provided at predetermined time intervals, in response to events such as the encoder detecting a scene change, in response to a request from the graphics engine, and the like.

Some embodiments of the processor 215 are implemented using one or more of a field programmable gate array (FPGA), a central processing unit (CPU), a graphics processing unit (GPU), a fixed function hardware block, and a general purpose processing unit. Some embodiments of the processor 215 are configured to generate the configuration information based on one or more of instructions provided by an application that produces the graphics content, an empirically generated lookup table, a closed-loop control method, machine learning, a neural network, and regressive modeling.

Figure 3:
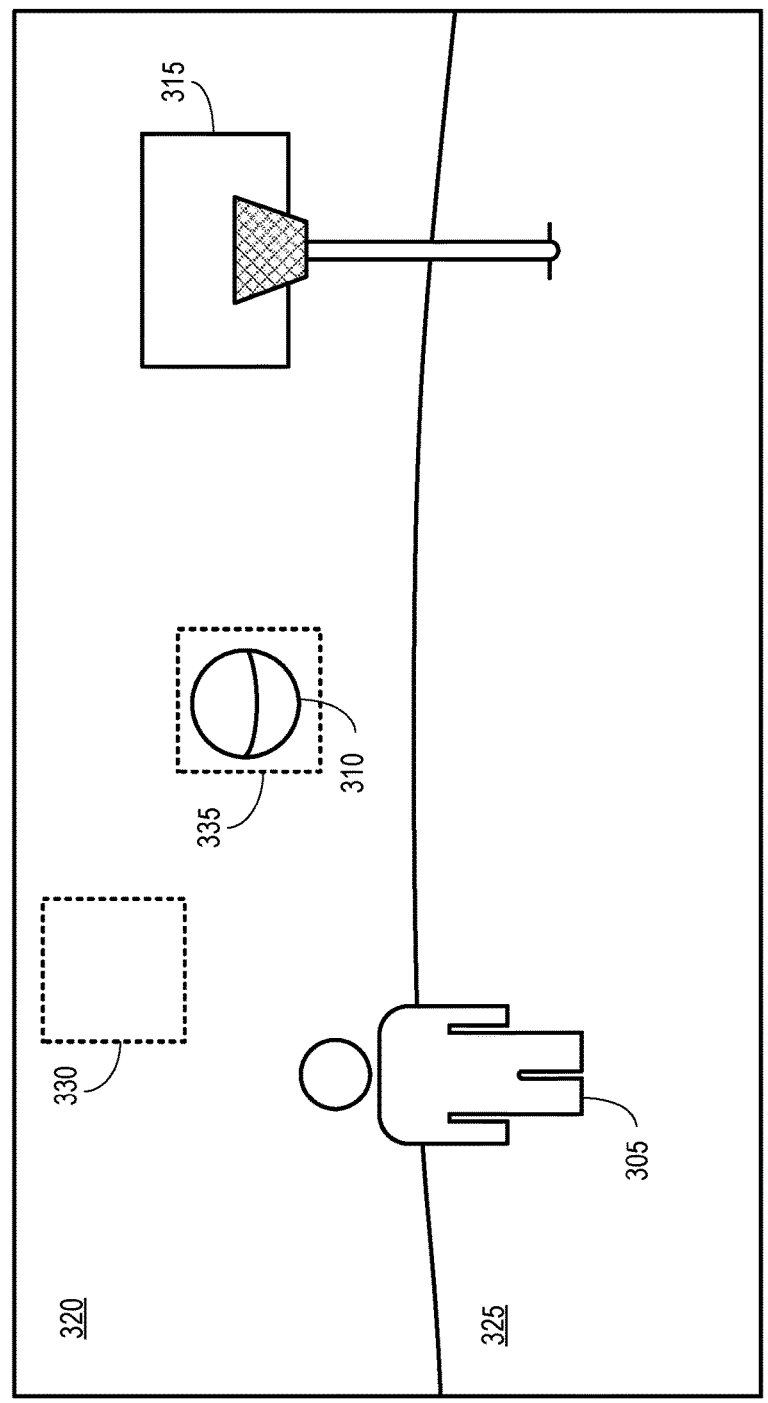
FIG. 3 is an example of an image that is generated by a graphics engine and encoded for transmission over a network according to some embodiments.

FIG. 3 is an example of an image 300 that is generated by a graphics engine and encoded for transmission over a network according to some embodiments. Graphics content representative of the image 300 is generated by some embodiments of the graphics engine 105 shown in FIG. 1. The image 300 includes a player 305 that is shooting a basketball 310 at a hoop 315. The image 300 also includes sky 320 in the background of the image 300 and ground 325. The graphics content representative of the image 300 is provided to an encoder such as the encoder 125 shown in FIG. 1. The encoder encodes the graphics content, e.g., using a compression algorithm to compress the received bitstream representative of the image 300, and provides feedback to a feedback processor such as the feedback processor 135 shown in FIG. 1.

The feedback includes information associated with different regions 330, 335 within the image 300. For example, the feedback associated with the region 330 that includes a portion of the sky 320 in the background of the image 300 includes information indicating a bit rate cost for encoding the region 330. If the bit rate cost for the region 330 is relatively high, which indicates that the encoder is expending an unnecessarily high number of bits to encode the region 330, the feedback processor generates configuration information to configure the graphics engine to reduce a level of detail used to render the region 330 or to modify the effects that are applied to render the region 330, as discussed herein. For another example, the feedback associated with the region 335 that includes the basketball 310 includes statistics indicating that the pixel values in the region 335 are changing rapidly due to motion of the basketball 310. The feedback processor therefore generates configuration information to configure the graphics engine to modify rendering options or settings to account for the motion of the basketball 310.

Figure 4:
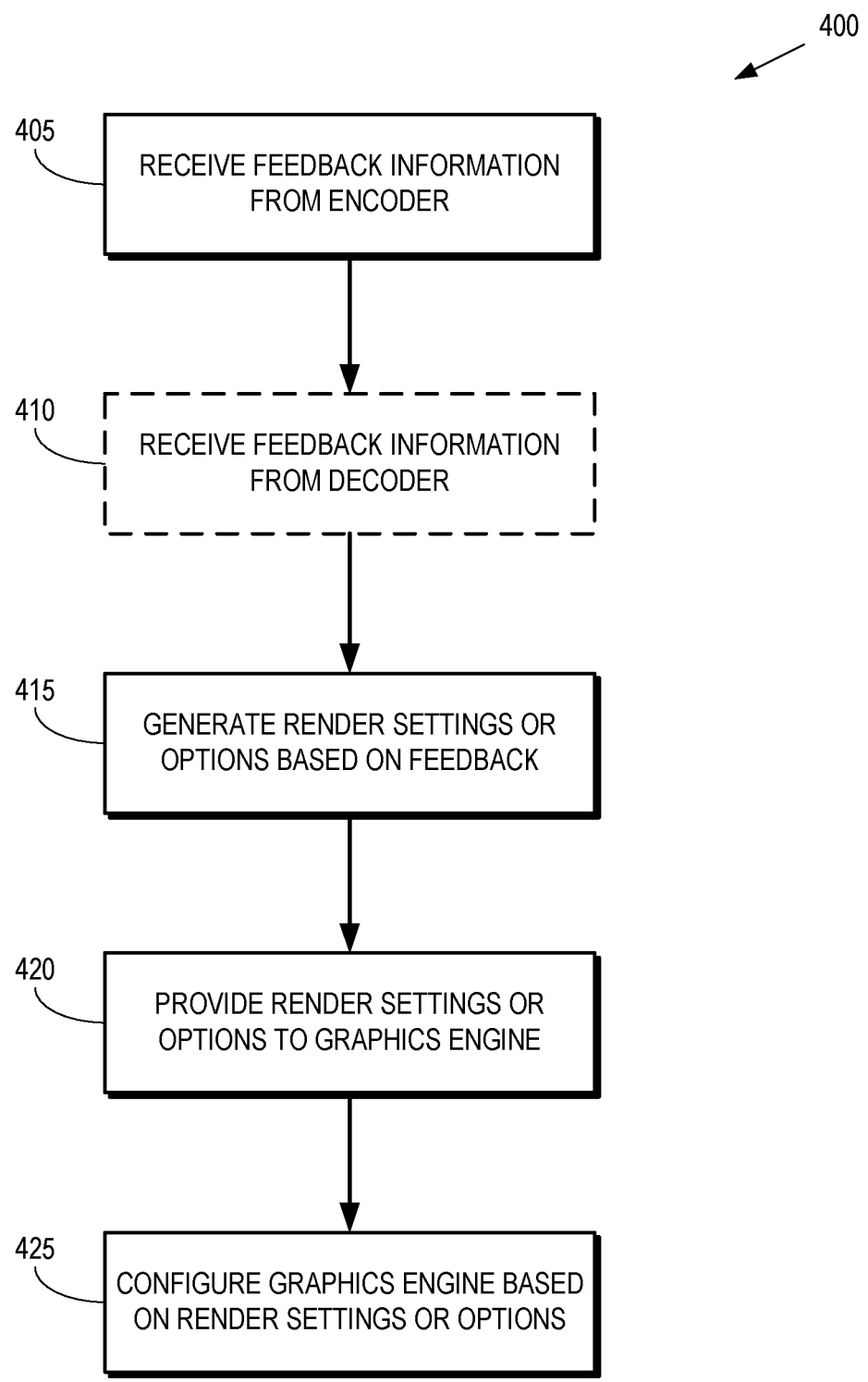
FIG. 4 is a flow diagram of a method of configuring a graphics engine based on feedback received from an encoder that encodes graphics content produced by the graphics engine according to some embodiments.

FIG. 4 is a flow diagram of a method 400 of configuring a graphics engine based on feedback received from an encoder that encodes graphics content produced by the graphics engine according to some embodiments. The method 400 is implemented in some embodiments of the cloud server 120 shown in FIG. 1 and the feedback processing module 200 shown in FIG. 2.

At block 405, the feedback processing module receives feedback information from the encoder. As discussed herein, the feedback information is generated based upon encoding of the graphics content by the encoder. At block 410, the feedback processing module receives feedback information from a decoder that is configured to decode information encoded by the encoder. As discussed herein, the decoder optionally provides the feedback information and some embodiments of the feedback processing module do not receive feedback information from the decoder, as indicated by the dashed lines of the block 410.

At block 415, the feedback processing module generates rendering settings or options based on the feedback received from the encoder and, if available, the feedback received from the decoder. At block 420, the feedback processing module provides the rendering settings or options to the graphics engine. At block 425, the graphics engine is configured based on the rendering settings or options provided by the feedback processing module.

In some embodiments, the apparatus and techniques described above are implemented in a system comprising one or more integrated circuit (IC) devices (also referred to as integrated circuit packages or microchips), such as the feedback processing module described above with reference to FIGS. 1-4. Electronic design automation (EDA) and computer aided design (CAD) software tools are used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device are stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device is required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a feedback processor configured to generate configuration information for a graphics engine based on encoder feedback received from an encoder and on decoder feedback received from a decoder, wherein the encoder is used to encode graphics content generated by the graphics engine, and wherein the configuration information includes an indication of whether sub-pixel motion compensation is supported based on the decoder feedback;
wherein the graphics engine is configured to execute a workload to generate graphics content for encoding by the encoder based on the configuration information.

2. The apparatus of claim 1, wherein the encoder feedback comprises at least one of motion information, quantization strength, bit rate cost, spatial variance, prediction mode, and objective quality metrics for one or more different regions of graphics content.

3. The apparatus of claim 1, wherein the encoder feedback comprises information indicating detection of a change of scene in graphics content.

4. The apparatus of claim 1, wherein at least one of the encoder feedback comprises information associated with preprocessing of the graphics content prior to encoding or the decoder feedback comprises information associated with post-processing at a receiver after decoding the encoded graphics content.

5. The apparatus of claim 4, wherein the information associated with preprocessing or post-processing comprises at least one of a Fast Fourier Transform (FFT) parameter, a discrete cosine transform (DCT) parameter, a histogram, an edge detection result, and a text detection result.

6. The apparatus of claim 1, wherein the decoder feedback comprises at least one of:
   information indicating whether the decoder is successfully decoding the encoded graphics content in real time; and
   information identifying supported or unsupported codec tools.

7. The apparatus of claim 1, wherein the processor is configured to generate the configuration information based on at least one of: instructions provided by an application that produces the graphics content; an empirically generated lookup table; a close-loop control process; machine learning; a neural network; and regressive modeling.

8. The apparatus of claim 1, further comprising:
   modifying rendering settings of the graphics engine for a first region of the graphics content and a second region of the graphics content to configure the graphics engine to perform at least one of:
   disabling at least one graphics effect in at least the first region of the graphics content based on bit rate costs of encoding at least the first region at the encoder;
   disabling at least one graphics effect in at least one of the first region of the graphics content in response to the encoder feedback indicating that there is insufficient bandwidth to support encoder quantization of the at least one graphics effect;
   modifying a rendering frame rate in response to the encoder feedback indicating that the encoder is able to vary its frame rate on a predetermined frame boundary to reduce a bandwidth of an encoded bitstream representing the graphics content; and
   reducing an image resolution used to render the graphics content based on encoder statistics received in the encoder feedback.

9. The apparatus of claim 1, wherein the encoder feedback includes a first bit rate cost of encoding a first region of the graphics content at the encoder and a second bit rate cost of encoding a second region of the graphics content at the encoder, and wherein the configuration information modifies rendering settings of the graphics engine for the first region based on the first bit rate cost and modifies the rendering settings of the graphics engine for the second region based on the second bit rate cost.

10. A method comprising:
   receiving, at a feedback processing module, encoder feedback from an encoder and decoder feedback received from a decoder, wherein the encoder feedback comprises parameters associated with encoding graphics content generated by a graphics engine;
   generating, at the feedback processing module, configuration information for the graphics engine based on the encoder feedback and the decoder feedback, the configuration information comprising an indication of whether sub-pixel motion compensation is supported based at least in part on the decoder feedback;
   configuring the graphics engine using the configuration information; and
   responsive to configuring the graphics engine, executing at least one workload to generate graphics content for encoding by the encoder at the graphics engine.

11. The method of claim 10, wherein receiving the encoder feedback further comprises receiving at least one of motion information, a quantization strength, bit rate cost, spatial variance, prediction mode, and objective quality metrics for one or more different regions of the graphics content.

12. The method of claim 10, wherein receiving the encoder feedback comprises receiving information indicating detection of a change of scene in the graphics content.

13. The method of claim 10, wherein receiving the encoder feedback comprises receiving at least one of information associated with preprocessing of the graphics content prior to encoding or post-processing after decoding the encoded graphics content.

14. The method of claim 13, wherein receiving the information associated with preprocessing or post-processing comprises receiving at least one of a Fast Fourier Transform (FFT) parameter, a discrete cosine transform (DCT) parameter, a histogram, an edge detection result, and a text detection result.

15. The method of claim 10, wherein receiving the decoder feedback comprises receiving at least one of:
   information indicating whether the decoder is successfully decoding the encoded graphics content in real time; and
   information identifying supported or unsupported codec tools.

16. The method of claim 10, wherein generating the configuration information comprises generating the configuration information based on at least one of instructions provided by an application that produces the graphics content, an empirically generated lookup table, a close-loop control method, machine learning, a neural network, and regressive modeling.

17. The method of claim 16, further comprising:
   disabling at least one graphics effect in at least a first region of the graphics content based on bit rate costs of encoding at least the first region at the encoder;
   disabling at least one graphics effect in the first region of the graphics content in response to the encoder feedback indicating that there is insufficient bandwidth to support encoder quantization of the at least one graphics effect;
   modifying a rendering frame rate in response to the encoder feedback indicating that the encoder is able to vary its frame rate on a predetermined frame boundary to reduce a bandwidth of an encoded bitstream representing the graphics content; and
   reducing an image resolution used to render the graphics content based on encoder statistics received in the encoder feedback.

18. An apparatus comprising:
   a graphics engine configured to generate graphics content;
   an encoder configured to encode the graphics content for transmission and generate encoder feedback comprising parameters associated with the encoding of the graphics content; and
   a feedback processing module configured to receive the encoder feedback from the encoder and decoder feedback from a decoder,
   the feedback processing module further configured to generate configuration information for the graphics engine based on the encoder feedback and the decoder feedback, the configuration information indicating whether sub-pixel motion compensation is supported based at least in part on the decoder feedback,
   wherein the graphics engine is reconfigured based on the configuration information generated by the feedback processing module.

19. The apparatus of claim 18, wherein the graphics engine is configured to perform at least one of:
- disabling at least one graphics effect in at least one of a plurality of regions of the graphics content based on bit rate costs of encoding the plurality of regions at the encoder;
- disabling at least one graphics effect in at least one of the plurality of regions of the graphics content in response to the encoder feedback indicating that there is insufficient bandwidth to support encoder quantization of the at least one graphics effect;
- modifying a rendering frame rate in response to the encoder feedback indicating that the encoder is able to vary its frame rate on a predetermined frame boundary to reduce a bandwidth of an encoded bitstream representing the graphics content; and
- reducing an image resolution used to render the graphics content based on encoder statistics received in the encoder feedback.

20. The apparatus of claim 18, wherein the feedback processing module is implemented using at least one of a field programmable gate array (FPGA), a central processing unit (CPU), a graphics processing unit (GPU), a fixed function hardware block, and a general purpose processing unit.

\* \* \* \* \*